United States Patent
Wang et al.

(10) Patent No.: US 12,437,406 B2
(45) Date of Patent: Oct. 7, 2025

(54) AUTOMATED MEDICAL IMAGE AND SEGMENTATION QUALITY ASSESSMENT FOR MACHINE LEARNING TASKS

(71) Applicant: International Business Machines Corporation, Armonk, NY (US)

(72) Inventors: Yi-Qing Wang, Paris (FR); Giovanni John Jacques Palma, Velizy Villacoublay (FR)

(73) Assignee: International Business Machines Corporation, Armonk, NY (US)

( * ) Notice: Subject to any disclaimer, the term of this patent is extended or adjusted under 35 U.S.C. 154(b) by 713 days.

(21) Appl. No.: 17/680,799

(22) Filed: Feb. 25, 2022

(65) Prior Publication Data

US 2023/0274436 A1    Aug. 31, 2023

(51) Int. Cl.
*G06T 7/00* (2017.01)
*G06T 7/10* (2017.01)

(52) U.S. Cl.
CPC .............. *G06T 7/0016* (2013.01); *G06T 7/10* (2017.01); *G06T 2207/10081* (2013.01);
(Continued)

(58) Field of Classification Search
CPC .................... G06T 7/0016; G06T 7/10; G06T 2207/10081; G06T 2207/10088;
(Continued)

(56) References Cited

U.S. PATENT DOCUMENTS

| 9,449,380 | B2 | 9/2016 | Mehta | |
|---|---|---|---|---|
| 2013/0251219 | A1* | 9/2013 | Mehta | G16H 30/40 382/128 |

(Continued)

FOREIGN PATENT DOCUMENTS

| CN | 111583249 A | 8/2020 |
|---|---|---|
| CN | 113222996 A | 8/2021 |

OTHER PUBLICATIONS

Esses, Steven J. et al., "Automated Image Quality Evaluation of T2-Weighted Liver MRI Utilizing Deep Learning Architecture", 2017 International Society for Magnetic Resonance in Medicine, ePub Jun. 3, 2017, 6 pages.

(Continued)

*Primary Examiner* — John J Lee
(74) *Attorney, Agent, or Firm* — CHIP LAW GROUP

(57) ABSTRACT

Mechanisms for identifying inconsistencies between volumes of medical images are provided. A plurality of volumes of medical images are received, each having a plurality of medical images of an anatomical structure. A plurality of first representation data structures are generated, each corresponding to a volume and having dimensional measurements of the anatomical structure at various locations. A reference data structure is generated, for the anatomical structure based on the first representation data structures, having second dimensional measurements derived from the first dimensional measurements. A discrepancy is detected between a second representation data structure and the reference data structure based on a comparison and a notification of the discrepancy where the notification identifies a type of the discrepancy.

20 Claims, 7 Drawing Sheets

(52) U.S. Cl.
CPC ............... *G06T 2207/10088* (2013.01); *G06T 2207/20081* (2013.01); *G06T 2207/20084* (2013.01); *G06T 2207/30056* (2013.01); *G06T 2207/30168* (2013.01)

(58) Field of Classification Search
CPC . G06T 2207/20081; G06T 2207/20084; G06T 2207/30056; G06T 2207/30168
See application file for complete search history.

(56) References Cited

U.S. PATENT DOCUMENTS

| | | |
|---|---|---|
| 2018/0114325 A1 | 4/2018 | Sanders et al. |
| 2020/0211678 A1* | 7/2020 | Foley ................... G16H 10/60 |
| 2024/0148464 A1* | 5/2024 | Freeman ............... A61M 16/04 |

OTHER PUBLICATIONS

Ma, Jeffrey J. et al., "Diagnostic Image Quality Assessment and Classification in Medical Imaging: Opportunities and Challenges", Proc IEEE Int Symp Biomed Imaging, Apr. 2020, 14 pages.

Sadri, Amir R. et al., "MRQy: An Open-Source Tool for Quality Control of MR Imaging Data", arXiv:2004.04871v3 [eess.IV], Aug. 17, 2020, 30 pages.

\* cited by examiner

**A VOLUME ACQUISITION INCONSISTENCY IS DETECTED. THE INCONSISTENCY APPEARS TO BE A PARTIAL SEGMENTATION DUE TO POOR IMAGE QUALITY

AUTOMATED MEDICAL IMAGE AND SEGMENTATION QUALITY ASSESSMENT FOR MACHINE LEARNING TASKS

BACKGROUND

The present application relates generally to an improved data processing apparatus and method and more specifically to mechanisms for performing an automated medical image and segmentation quality assessment for machine learning tasks.

Artificial intelligence (AI) increasingly utilizes machine learning computer models to model various real-world mechanisms, such as biological mechanisms, physics based mechanisms, business and commercial mechanisms, and the like, typically for predictive purposes. Such machine learning (ML) computer models include linear regression models, logistic regression, linear discriminant analysis, decision trees, naïve Bayes, K-nearest neighbors, learning vector quantization, support vector machines, random forest, and deep neural networks. While ML computer models provide a good tool for performing such predictive operations, the process of generating, training, and testing such ML computer models is a very time consuming and resource consuming intensive process often requiring a large amount of manual effort requiring a lot of experimentation.

Moreover, the effectiveness of ML computer models is highly dependent on the training of these ML computer models, which in turn is highly dependent upon the quality of the training data used to train these ML computer models. This is especially true in the medical domain, such as in cases where ML computer models are used to assist with the analysis of medical images. In such cases, ML computer models are employed to assist subject matter experts (SMEs), such as radiologists and the like, to identify structures within captured medical images to determine not only standard anatomical structures, e.g., organs, skeletal elements, etc., but also to identify structures that may be anomalous. However, the ability to train such ML computer models to perform such tasks for medical image analysis is dependent upon the quality of the medical images and the image processing, and/or SME annotations used to generate the training data, with improper operation of the trained ML computer models potentially leading to severe consequences should anomalies not be detected or be detected erroneously.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a medical image computer system, for identifying inconsistencies between volumes of medical images is provided. The method comprises receiving, by the medical image computer system, a plurality of volumes of medical images, each volume of medical images comprising a plurality of medical images, of an anatomical structure of a patient, captured by medical imaging equipment. The method further comprises generating, by the medical image computer system, a plurality of first representation data structures, each first representation data structure corresponding to a volume in the plurality of volumes of medical images. Each first representation data structure comprises a first dimensional measurements of the anatomical structure at various locations.

Moreover, the method comprises generating, by the medical image computer system, a reference data structure for the anatomical structure of the patient based on the first representation data structures. The reference data structure comprises second dimensional measurements derived from the first dimensional measurements. In addition, the method comprises detecting, by the medical image computer system, a discrepancy between a second representation data structure and the reference data structure based on a comparison of the second representation data structure and the reference data structure. Furthermore, the method comprises outputting, by the medical image computer system, a notification of the discrepancy to a computing system in response to detecting the discrepancy.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
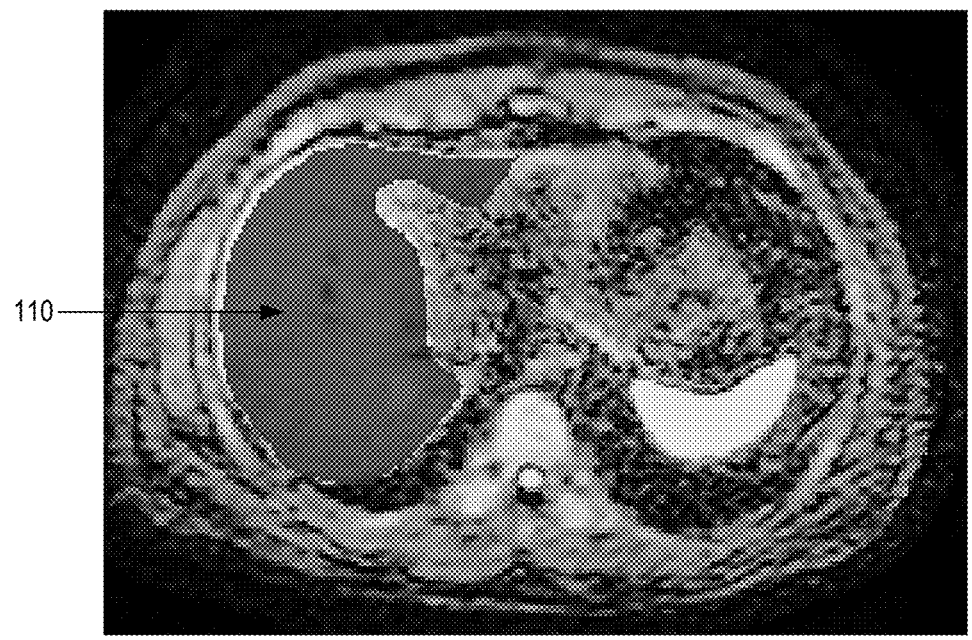
FIG. 1 is an example diagram of a medical image or slice in which the liver is partially marked by a mask which may be used to generate measurements of the dimensions of the liver.

The illustrative embodiments provide an automated improved computing tool to assess the quality of medical imaging data that is to be used to train a machine learning (ML) computer model, and to assess the prediction quality of the trained ML computer model, where this trained ML computer model may be a neural network, such as a convolutional neural network (CNN), recurrent neural network (RNN), or the like, a deep learning computer model, or any other suitable ML computer model that is trained through a machine learning process, e.g., supervised or unsupervised machine learning, to cause the ML computer model to be trained to recognize patterns in input data and generate predictions based on these recognized patterns. In some illustrative embodiments, the quality assessment may be based on a reference data structure, such as a reference profile, for an anatomical structure of interest, e.g., an organ or other anatomical structure, and the detection of outliers from this reference data structure, e.g., reference profile, where this reference data structure is generated in a specific automated computer process as will be detailed hereafter. The illustrative embodiments further provide mechanisms for assessing the quality of the medical imaging data and/or predictions of the trained ML computer model with regard to possible sources of error and for generating notifications to medical imaging personnel as to the nature of the potential sources of error so that appropriate corrective action can be taken. For example, the medical imaging personnel may be informed that there is insufficient representation of the anatomical structure of interest in a captured scan, there are image quality issues of the images actually captured during the scan, or the like. Such evaluations and notifications may be performed during training of the ML computer model to determine whether particular images or volumes of images should be included in training data, and may also be performed during inference time after the ML computer model is trained, so as to inform a medical imaging specialist of potential issues with the operation of the ML computer model due to the input medical images provided to the trained ML computer model.

Because ML computer models are generally known and machine learning training processes are generally known, a detailed explanation of these will not be provided herein. However, as an overview, as is generally known in the art, the ML computer models are trained to recognize patterns in input data and based on these patterns generate a prediction corresponding to these patterns. The training may involve multiple iterations, or epochs, in which the output of the ML computer model is compared to a ground truth and an error is determined, which is then used to adjust operational parameters of the ML computer model to reduce the error, until the error is within an acceptable range. Rather than modifying the ML computer model or ML computer model training processes, the improved computing tool of the illustrative embodiments is specifically directed to, and configured to, perform the improved computer specific operations set forth hereafter with regard to one or more of the illustrative embodiments, to address the challenges of data quality checking and ML computer model failure detection in the medical imaging domain.

As noted above, the performance of a trained ML computer model is highly dependent upon the quality of the training data. This is especially true in the medical imaging domain where the training of the ML computer model for identifying structures and anomalies within medical images to perform prediction operations is very much dependent on the way the medical images are acquired and the accuracy of the annotated masks used in the training data to annotate structures within the medical images. Poorly acquired medical images and inaccurately annotated masks will tend to mis-train the ML computer model and thus, should be discarded from the training data or corrected prior to inclusion in the training data. The illustrative embodiments provide an improved computing tool to automatically evaluate medical images to determine their quality, both with regard to image quality and annotation quality, for inclusion or exclusion from training data for training a ML computer model operating on medical images to perform prediction operations.

Moreover, after training of the ML computer model, i.e., at inference time, the performance of the trained ML computer model may be dependent upon the quality of the segmentation of medical images that are input to the trained ML computer model. That is, if the segmentation process fails or generates poor results, then the poor input to the trained ML computer model will result in an inaccurate output of the trained ML computer model. The illustrative embodiments provide automated mechanisms for evaluating the prediction quality of the trained ML computer model by looking to the quality of the input medical images, without having to access a ground truth, in order to determine whether the segmentation operations failed due to a partial acquisition of medical images, i.e., the entire anatomical structure of interest is not present in the volume, or due to partial segmentation, i.e., there are medical images in the volume where the quality of the image is too poor to recognize the anatomical structure and perform segmentation, or the algorithm itself fails due to imperfections in the algorithm operating on the medical image.

The illustrative embodiments provide mechanisms for generating a reference profile for an anatomical structure of interest from a plurality of scan profiles. The reference profile is then used as a basis for evaluating discrepancies of other scan profiles to determine if the scan profile is considered an outlier. If a scan profile is determined to be an outlier, a source of error of the scan profile that causes it to be an outlier may be determined based on the nature of the difference between the scan profile and the reference profile. From this outlier determination, a notification may be provided to a subject matter expert (SME) or other authorized user to inform them of the outlier and the source of error so that corrective action can be taken, such as removal or non-inclusion of the scan from/in training data, adjusting operational parameters of the medical imaging equipment used to capture the scan, and/or discarding the scan and retaking the scan to obtain higher quality medical images and a better scan profile that more closely resembles the reference profile for the anatomical structure of interest. In some cases, the source of the error may be determined to not be because of the medical imaging equipment at all, and may be due to medical procedures that were performed on the patient between the current scan and previous scans of the patient, and such a source of error may also be identified by the mechanisms of the illustrative embodiments.

The mechanisms of the illustrative embodiments operate on a plurality of multi-phase/multi-sequence volumes, also referred to as acquisitions or scans, of medical images for a patient over time. For purposes of the illustration, the present description of the illustrative embodiments will focus on a human liver scans which involve a multi-phase/multi-sequence volume of medical images, acquired using any suitable medical imaging equipment, such as computerized tomography (CT) machines, X-ray based machines, Magnetic Resonance Imaging (MM) machines, sonogram machines, or the like. While human liver CT scans will be used as an example, it should be appreciated that the mechanisms of the illustrative embodiments are not limited to any one area of the human body or any particular anatomical structures and may be implemented with regard to medical imaging targeting any region of the human body and any anatomical structures, e.g., any desired organs, skeletal structures, or the like. The illustrative embodiments are also not limited to any specific medical imaging technology for capturing the medical images. Moreover, the illustrative embodiments are not limited to human anatomy and may be applied to other medical imaging used with other types of biological entities, such as large and small animals in the case of veterinary practices. The various applications of the mechanisms of the illustrative embodiments to various medical imaging studies of various biological entities will be apparent to those of ordinary skill in the art in view of the present description.

For purposes of the illustrative embodiments, it is assumed that a plurality of medical images of an anatomical structure of interest, e.g., a human liver, of a given patient are received as input from a medical imaging system. The medical imaging system comprises various equipment for capturing images of the internal anatomy of the patient and representing those images in an electronic manner as data which can be used for analysis and viewing of digital representations of the captured images. Such medical imaging mechanisms are generally known in the art. The plurality of medical images may together be considered a volume, scan, or "acquisition" of medical images, where each medical image may be considered a two-dimensional planar "slice" of the anatomical structure of interest at a particular depth, such that the combination of the slices represents a three-dimensional representation of the anatomical structure. The concepts of volumes of medical images, slices, and the like, are generally known in the medical imaging field and thus, a more detailed explanation of how to generate volumes of medical images and slices is not provided herein.

With the mechanisms of the illustrative embodiments, for each medical image, or slice, in the volume, a measure of the anatomical structure is generated by the medical imaging system which comprises logic for analyzing the data of the individual medical images, performing segmentation operations to identify anatomical structures within the medical images based on image analysis to generate contours and masks marking the anatomical structures, and generating measures of the dimensions of these identified anatomical structures based on the contours and masks, e.g., cross-sectional size or area of the anatomical structure. Each medical image represents a two-dimensional cross section of the anatomical structure, e.g., liver, at a particular location, or depth, of the scan, where the location may be axial, sagittal, coronal or any other location providing cross sectional views of the volume (axial will be used hereafter as only an example). FIG. 1 is an example diagram of a medical image or slice in which the liver is partially marked by a mask 110 which may be used to generate measurements of the dimensions of the liver. By combining the measurements obtained from the segmentation and analysis of the individual medical images or slices at each location, a profile of the anatomical structure may be generated as an interpolated graph of the measures.

Figure 2:
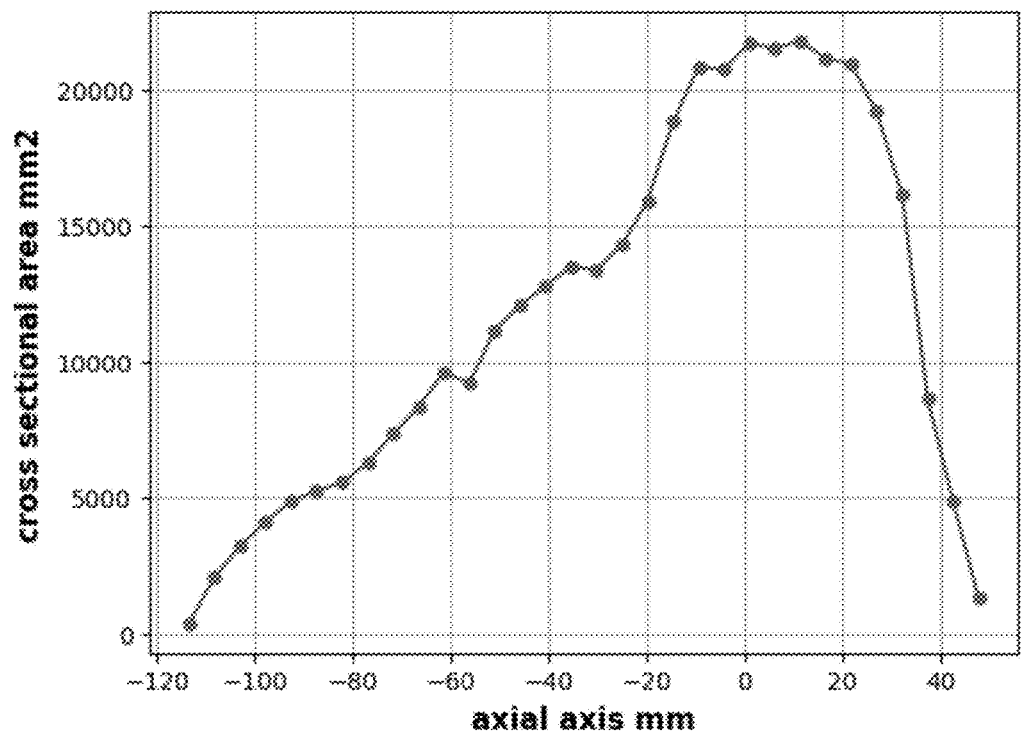
FIG. 2 is an example of a scan profile of a volume of medical images for a liver of a given patient.

For example, FIG. 2 is an example of a scan profile of a volume of medical images for a liver of a given patient. The scan profile is a plot of physical dimensions, e.g., in millimeters, with regard to both a scan depth or axial axis (horizontal axis), and a cross-sectional size or area (vertical axis). The graph is an interpolated graph where individual discrete points in the scan profile correspond to individual medical images or slices in the volume and the curve is interpolated from these discrete points. In the example scan profile, at each axial location, or depth, of the volume/scan, a corresponding measure of the cross-sectional size of the liver is calculated based on the segmentation and measuring of dimensions of the generated mask, e.g., liver mask, in the corresponding medical image or slice. As can be seen in FIG. 2, the scan profile for the liver typically peaks at an axial plane which passes through the left and right liver lobes and decreases as the medical image capturing equipment moves to the inferior and superior liver surfaces.

It should be appreciated that the segmentation of medical images and the generation of measures of cross-sectional size of anatomical structures based on such segmentations are generally known in the art, and thus, a more detailed explanation of these processes are not provided herein. It should be appreciated that while the cross-sectional size is used in these examples, other suitable dimensions of the anatomical structure of interest may also be used in addition to or instead of the cross-sectional size to generate a scan profile for a given volume of medical images or slices. It should also be appreciated that other approaches which directly operate on the segmented masks of the medical images may also be utilized as will be apparent to those of ordinary skill in the art, with the scan profile being one illustrative embodiment. Thus, in other illustrative embodiments, rather than using scan profiles and reference profiles, the mechanisms of the illustrative embodiments may also utilize the segmented masks themselves such that the segmented masks may be used to generate a reference mask and then the segmented masks may be evaluated relative to the reference mask.

The illustrative embodiments operate on a plurality of volumes of medical images for the same patient captured over time, where the volumes comprise medical images of a same anatomical structure of the patient. Thus, for example, over time, a patient's liver may be captured in multiple volumes of medical images, each volume comprising a plurality of medical images or slices that are intended to capture a representation of the liver, e.g., each volume may be a different CT scan of the patient's liver. Each of these volumes will have their own separate scan profile generated similar to that shown in FIG. 2. In general, it is assumed that because the volumes are directed to the same anatomical structure of the same patient over time, the scan profiles should be similar barring some problems with the way in which the medical images were captured or some new medical condition of the patient, e.g., a partial liver removal or other procedure occurring with the patient between CT scans, an enlargement of the liver (hepatomegaly) due to a disease, or the like.

Figure 3:
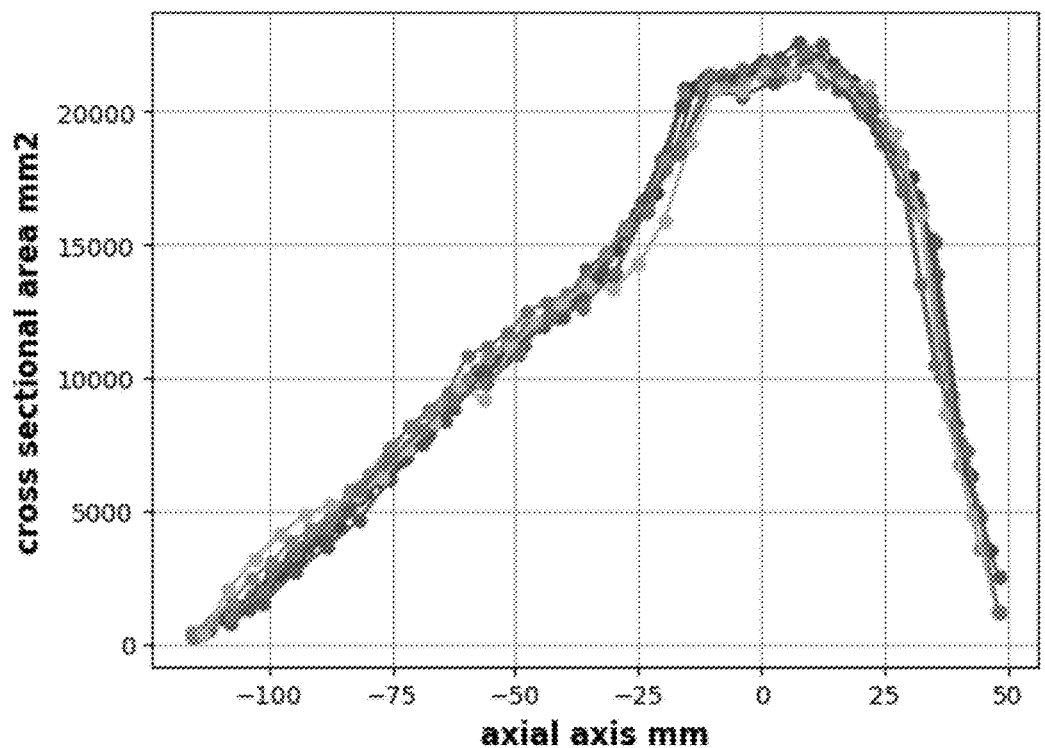
FIG. 3 is an example diagram showing a plurality of liver scan profiles for a plurality of volumes of medical images for a given patient in accordance with one illustrative embodiment.

FIG. 3 is an example diagram showing a plurality of liver scan profiles for a plurality of volumes of medical images for a given patient in accordance with one illustrative embodiment. In this example, as is apparent from the visually represented agreement between the scan profiles, the medical images of the volumes and the segmentation performed with regard to each volume (which provides the cross-sectional size for purposes of generating the scan profile) are consistent between the volumes, indicating that there are no low quality medical images where incorrect cross-sectional sizes were determined, no cross-sectional sizes were determined due to an inability to identify the liver through segmentation of the medical images, or that there were any unexpected cross-sectional measurements, such as due to an enlargement of the liver or the liver being much smaller than expected due to an injury, medical procedure, or the like. Thus, as can be seen from FIG. 3, many different scans, or volumes of medical images, lead to very much the same scan profile of the liver. The scan profiles are not naturally aligned, however, as there is some translational difference along the horizontal axis.

The illustrative embodiments operate on the observation that there is much information that can be determined from identifying discrepancies between a reference anatomical structure profile and new scan profiles both during the training of a ML computer model and during inference time of a ML computer model. Thus, by providing a mechanism to determine the reference profile for an anatomical structure of a given patient, and then comparing subsequent scan profiles to that reference profile, information about the medical imaging performed, and the medical condition of the patient, may be gleaned from the results of the comparison. That is, situations may be identified in which scan profiles are incomplete, dimension measurements are significantly different from the reference profile indicating issues with the quality of the medical images, or the like. This information may be used to present notifications to appropriate personnel so as to adjust and/or repeat medical image capturing to obtain better quality images or more complete volumes, may be used to notify appropriate personnel of reasons why volumes may be incomplete, and the like.

Figure 4:
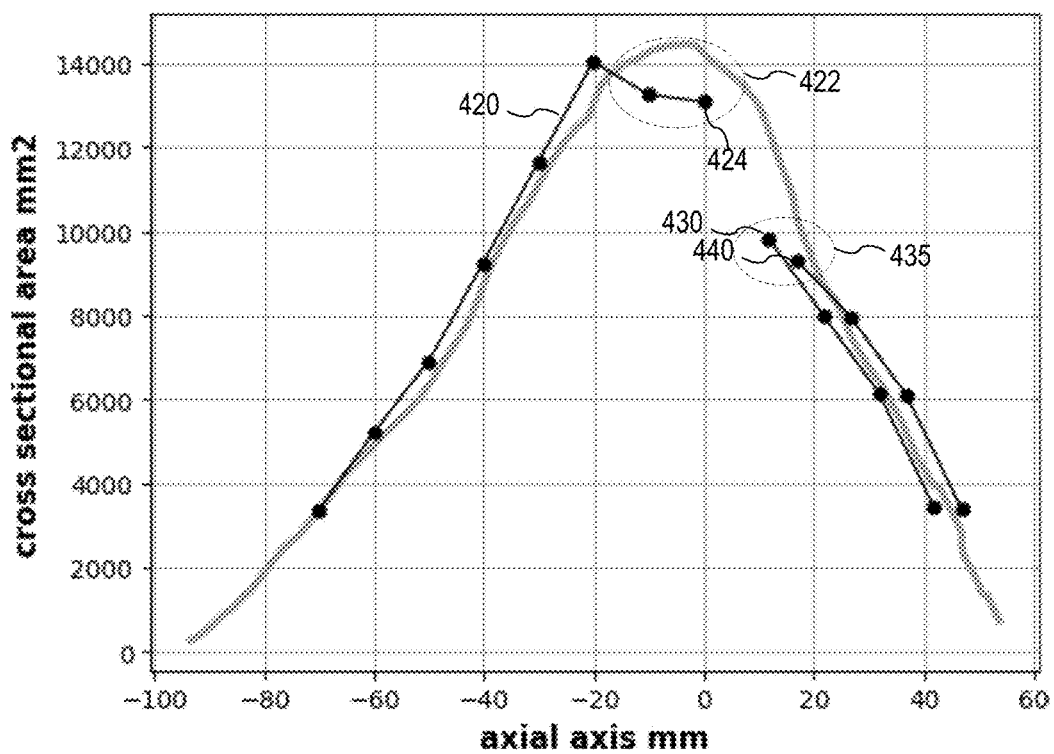
FIG. 4 is an example diagram illustrating a reference liver profile and a plurality of scan profiles generated for other volumes for the same patient and same anatomical structure in accordance with one illustrative embodiment.

For example, as shown in FIG. 4, a reference liver profile 410 is provided with scan profiles 420, 430, and 440 generated for other volumes for the same patient and same anatomical structure, e.g., the liver. As can be seen from FIG. 4, the scan profile 420 resembles the reference liver profile 410 until a point 424 at which the scan profile 420 fails to have any further detected liver in the medical images (the curve fails to continue to the right) and furthermore, the cross-sectional size measurements in the region 422 deviate significantly from the reference liver profile 410. Similarly, scan profiles 430 and 440 fail to capture the liver's cross sectional size in any medical images to the left on the horizontal axis and start to deviate from the reference profile in the region 435. These discrepancies from the reference liver profile 410 are informative of the medical image quality and/or segmentation operation. Ultimately, by identifying problems in the medical image quality and/or segmentation operation, a determination may be made as to whether medical images and/or volumes should be included in the training data for a ML computer model or not, and/or whether the operation of the ML computer model during inference time can be relied upon. That is, if the medical imaging data is of poor quality, or the segmentation operation was not performed satisfactorily to provide high quality data, then these medical images cannot be relied upon to provide accurate training of the ML computer model or accurate outputs of a trained ML computer model.

With regard to the particular issues that may be identified from a comparison of scan profiles 420-440 to a reference liver profile 410, various types of discrepancies may be identified and notified to appropriate SMEs, such as radiologists, doctors, or other personnel, so that appropriate actions can be taken. For example, scan profiles 420, 430, and 440 represent partial segmentations of the liver in the medical images of the corresponding scans. That is, at some point, the medical images no longer included the liver in the medical image with sufficient quality to be able to perform the segmentation and mask generation so that a cross-sectional size of the liver could be computed. This may be due to poor quality medical images having been captured or a problem in the segmentation algorithm. Such a situation of partial segmentations may be detected by identifying such discrepancies between the scan profiles 420-440 and the reference liver profile 410 and further looking to the number of medical images in the corresponding volumes or scans. For example, if the liver is no longer detected in the medical images of the volume as indicated by the lack of cross-sectional size measurement for the medical images, yet there are still more medical images in the volume, then it may be determined that there is an issue of a partial segmentation.

If however, a condition is detected where the liver is no longer detected in the medical images of the scan, but there are no additional medical images in the volume, then this is a problem with medical image acquisition as opposed to a problem with the medical image quality or segmentation operation. Thus, in such a case, e.g., the point 424 of scan profile 420 corresponds to a last medical image in the volume, then an issue of partial acquisition is detected to be present. That is, the scan does not include medical images for the entire liver and thus, the medical imaging scan is incomplete and should be performed again.

The issues of partial segmentation and partial acquisition are identified when there are breaks in the scan profiles such as shown in FIG. 4. It should be appreciated that other issues may also be detected by comparing scan profiles to the reference liver profile. For example, if a scan profile is complete, but has cross-sectional sizes that are smaller than the reference liver profile, then the smaller cross-sectional size values may be due to a physical discrepancy in the liver from previous scans. For example, a patient may have had a partial liver removal operation that would cause the liver to have a smaller (along the vertical axis) cross-sectional size at particular axial axis locations. Thus, the scan profile will differ from the reference liver profile and these differences can be measured from the comparison of the scan profile to the reference liver profile. Similarly, if the patient has a medical condition that causes an enlargement of the liver, then a scan profile will have cross-sectional size values that exceed the reference liver profile along the vertical axis. Such potential conditions may be identified by comparing the scan profile to the reference profile and appropriate notifications generated accordingly.

As noted above, a primary first operation of the illustrative embodiments is to be able to identify a reference profile for a given anatomical structure, e.g., the liver, for a given patient. The illustrative embodiments provide mechanisms for generating a reference profile for the anatomical structure, such as the liver, from a plurality of volumes and their corresponding scan profiles. The mechanisms utilize a specific process to generate this reference liver profile which implements an iterative alignment operation for the scan profiles of the various volumes utilizing an "agreement" metric and determines a median profile which, when the median profile stabilizes, may be selected as the reference profile for the anatomical structure. In a subsequent primary operation, the scan profiles may be compared to this reference profile to determine discrepancies and classify these discrepancies with regard to various medical imaging and/or medical condition issues, such as partial acquisition issues, partial segmentation issues, smaller than expected anatomical structure size, or larger than expected anatomical structure size, and the possible sources of these issues, e.g., failure to capture sufficient number of medical images, poor quality imaging, potential medical procedure having occurred, potential medical condition, etc.

With regard to the first primary operation, in order to fully describe the process, one must first be aware of some definitions. The anatomical structure, e.g., liver, profile is defined as a function that maps a transverse plane to its corresponding liver cross-sectional area. By definition, the liver profile requires an infinity of axial liver slices and cannot be computed directly. However, since the liver is a smooth three dimensional object, its profile is continuous. Therefore, it can be estimated from a medical scan produced by imagining techniques such as CT and MR, which samples liver slices on a regular interval. Specifically, consider an n-slice axial liver scan whose slice spacing was set to $s_z$ (in millimeters). Let $S_i$ denote the cross-sectional area in square millimeters of the liver captured in the scan's i-th slice. Let $\varphi$ be an interpolation through the points $\{(i,S_i)\}i=0, \ldots, n-1$. For example, the linear interpolation leads to:

$$\varphi(x)=(S_{[x]+1}-S[x])(x-[x])+S[x], x \in [0,n-1) \quad (1)$$

where [x] denotes the largest integer less than or equal to $x \in \mathbb{R}$ (i.e., is an arbitrary real number). To account for the scan's spatial resolution, the interpolation $\varphi(x)$ is then scaled by the scan's slice spacing $s_z$ to result in the scan profile $P(t):=\varphi(t/s_z)$. Over its support $\{t | P(t) > 0\}$, the scan profile can be considered as an approximation of the liver profile. The support's length is referred to as the scan's liver "span". Note that it is an arbitrary choice to give the index of zero to the scan's first slice in Eq. (1) above and instead, this value could be set to another value, such as 1, and maintain the same concept of the scan profile. In other words, both liver and scan profile are uniquely defined only up to a translation.

In the absence of major clinical events (such as a partial hepatectomy), a liver tends to have a rather static profile over time because it is stuck to the ribcage, which limits how far it can twist. In addition, as long as the direction of a patient's longitudinal axis is kept the same, the liver's axial cross-sectional areas are relatively insensitive to rigid body motions. As a result, a patient's various well performed scans should lead to similar looking scan profiles, all of which resemble the same underlying liver profile. Though the liver profiles may vary in shape from person to person, they have an asymmetrical bell shape in general, such as shown in FIGS. 2-3, for example. This bell shape is because, as noted above, the liver cross-sectional area usually peaks at a transverse plane which passes through both left and right liver lobes and gradually decreases as the medical imaging equipment moves along the plane towards the liver's superior or inferior surfaces.

Generally speaking, a scan profile is a noisy and partial estimation of its corresponding liver profile. The scan profile's quality depends on that of the scanned images and the accuracy of the liver cross-sectional area measurements. For patients who have undergone multiple liver scans, it is possible to obtain a more accurate view of their liver profiles.

To do so, consider a patient's m scan profiles $\{P_i\}_{i=1, \ldots, m}$. The scan profile supports, as defined previously, are of relative value because, in general, two different scans rarely portray the same abdominal region. However, because all these scan profiles describe the same patient's liver, a common coordinate system may be found to represent them.

Without loss of generality, assume that the patient's first scan has the greatest liver span. One can fix the first scan, or the scan with the greatest liver profile value, as the reference liver profile and then translate the other scan profiles to align with the selected reference liver profile individually. To this end, the illustrative embodiments utilize an "agreement" metric to assess the quality of alignment between two positive functions f and g with finite support, as shown in Eq. (2) below.

$$\text{agreement}(f, g) = \frac{\int_{\{t | f(t) > 0, g(t) > 0\}} \min(f(t), g(t)) dt}{\int_{\{t | f(t) > 0, g(t) > 0\}} \max(f(t), g(t)) dt} \quad (2)$$

where t is the depth or the z-coordinate (in millimeters) of the medical image or slice. In one illustrative embodiment, these two real functions f and g may be scan profiles $P_i$ and $P_j$, and one of the scan profiles may be the reference liver profile. In such a case, the agreement function is the Jaccard index of the areas underneath the two scan profiles restricted to their common support. Aligning a scan profile thus amounts to finding its optimally translated version that has the maximum agreement with the reference profile.

Once all the scan profiles have been aligned, an estimate of the reference liver profile may be generated. Specifically, the support of the reference liver profile is defined to be the union of the supports of the aligned scan profiles. The reference liver profile's values are set pointwise to the median of the aligned scan profiles, where the median profile (used as the new reference profile to start another iteration of alignment) is computed as follows:

$$P^*(t) = \text{median } \cup_{1 \leq i \leq m, P_i(t) > 0} \{P_i(t)\}, t \in \cup_{1 \leq i \leq m} \{t | P_i(t) > 0\} \quad (3)$$

where $P_i$ is used to denote an aligned scan profile. Next, the estimated reference liver profile $P^*$ is substituted for $P_i$ as the reference and the entire set of scan profiles are aligned again to this new estimated reference liver profile $P^*$. The last two operations are then repeated until successively obtained $P^*$ stabilizes, i.e., the agreement between the estimated reference liver profile $P^*$ and the previous estimate is equal to or greater than a given threshold, e.g., 0.99 or any other desired threshold value selected for the particular implementation. The estimated reference liver profile $P^*$ from the final iteration as the patient's estimated liver profile.

Thus, to obtain a reference profile for an anatomical structure of interest, such as the liver or another organ, skeletal structure, vascular structure, or the like, the following primary operations are performed given a plurality of volumes of medical images and their corresponding scan profiles:

1. Select a scan profile with the greatest span as an initial reference, i.e., a scan profile that has a medical image showing a greatest portion or span of the anatomical structure of interest, e.g., the largest amount of the liver, as a reference profile;
2. Translate, e.g., shift along the axial axis (horizontal axis in FIGS. 2-4) other scan profiles to maximize their respective agreement (see Eq. (2) above) with the reference profile;
3. Create a new reference profile by computing the pointwise median of the aligned scan profiles;
4. Align all the scan profiles to maximize their respective agreement with the reference profile, such as through translation or the like; and
5. Repeat operations 3 and 4 above until the median profile stabilizes, where the last selected reference profile after stabilization is considered the reference profile for the anatomical structure of interest.

More formally, and in accordance with some of the illustrative embodiments, the procedure's pseudo code may be provided as in Algorithm 1 below:

---
Algorithm 1: Liver Profile Estimation

Data: m scan profiles $\{P_i\}i=1,...,m$
Result: m aligned scan profiles and estimated liver profile $P^*$
$\alpha \leftarrow 0$;
$i \leftarrow 0$;
$P^*_0 \leftarrow$ the scan profile with the greatest liver span;
while $\alpha < X$ (e.g., X=0.99) and $i < Y$ (e.g., Y=5) do
    Align all the scan profiles with $P^*_0$;
    $P^*_1 \leftarrow$ pointwise median of the m aligned scan profiles, i.e. Eq.(3);
    $\alpha \leftarrow$ agreement($P^*_0, P^*_1$);
    $i \leftarrow i + 1$;
    $P^*_0 \leftarrow P^*_1$;
end
$P^* \leftarrow P^*_0$;

---

It should be appreciated that X and Y in the above algorithm are implementation specific parameters that may be set to different values depending on the desired operation. For example, X is a parameter for identifying stabilization of the agreement metric such that if the agreement is less than the X parameter, then it is determined that the median has not stabilized. Y is a parameter that places a limit on the number of iterations performed so as to avoid cases where the agreement does not stabilize with the given X threshold.

Once the reference liver profile is obtained through the process above, i.e., P* is determined as well as the aligned scan profiles $\{P_i, i=1, \ldots, m\}$ have been computed, the disparity between the reference liver profile P* and a scan profile $P_i$ provides information as to whether the volume, mask pair from which the estimate Pi is originally derived is faulty and if so, where this fault occurs. As noted above, such faults may occur because of span disparity or cross-sectional size disagreement. Span disparity may be due to a partial acquisition or partial segmentation. Cross-sectional size disagreement may be due to smaller than expected liver cross-sectional sizes or larger than expected liver cross-sectional sizes. Any of such discrepancies may be cause to notify a SME or other authorized personnel such that corrective action may be taken to avoid improper operation of an ML computer models being trained or otherwise operating on the volumes of medical images, which would lead to potentially incorrect results generated by the ML computer models.

As mentioned above, span disparity occurs when the liver (or anatomical structure of interest) is only partially observed in the medical images of the volume or scan. This may be due to two possible causes, first the scan's liver span was insufficient to cover the whole liver leading to a partial acquisition. Second, part of the scanned liver was not recognized due to measurement error or poor image quality, i.e., partial segmentation. Differentiating between the two possibilities may be performed by comparing the scan profile to the reference profile and analyzing the discrepancies, as well as looking to the number of medical images in the volume and where the discrepancies occur within the set of medical images. If the discrepancies occur to one end of the set of medical images, with no additional medical images occurring after the discrepancy, then it is most likely due to a partial acquisition. If the discrepancies occur with there being additional medical images in the volume, then it is most likely due to poor image quality or an inability to accurately perform the segmentation operation, resulting in a partial segmentation.

The cross-sectional size disagreement may be determined from comparing the scan profile to the reference liver profile to determine if the discrepancies between scan profile values and corresponding reference liver profile values at the same axis location (which may be axial, sagittal, coronal or any other location providing cross sectional views of the volume) indicate the scan profile values are greater than or less than the reference liver profile values by a threshold amount. For example, the agreement metric above in Eq. (2) may be used as a metric to determine an amount of agreement between points along the scan profile and the reference liver profile, with a threshold agreement value being set to indicate a significant amount of disagreement indicating a cross-sectional size disagreement. If the disagreement indicates that the scan profile is showing a greater size than the reference liver profile size, then it may be determined that some medical condition is causing an enlargement of the liver. If the disagreement indicates that the scan profile is showing a smaller size than the reference liver profile, then it may be determined that a medical procedure may have been performed to cause the smaller size. It should be appreciated that it is possible that both types of discrepancies, i.e., both a span disparity and a cross-sectional size disagreement, may be present in a scan and may be detected by the mechanisms of the illustrative embodiments.

Thus, the mechanisms of the illustrative embodiments provide an improved computing tool having logic to perform the operations above to determine a reference profile for an anatomical structure of interest, logic to detect discrepancies between scan profiles and the reference profile, and logic to classify those detected discrepancies with regard to different types of discrepancies and possible sources of error. The illustrative embodiments may generate notifications to appropriate personnel based on the detected discrepancies and possible sources of error so that corrective actions may be taken. The particular actions taken depend on the particular use case and whether the mechanisms of the illustrative embodiments are being used prior to training of a ML computer model or during runtime operation of the trained ML computer model, i.e., at inference time. For example, during training of the ML computer model, the mechanisms of the illustrative embodiments may be used to evaluate the volumes of medical images that are being considered for inclusion in training data for the ML computer model. If a volume of medical images is determined to have a discrepancy, e.g., a span disparity or cross-sectional size disagreement, then the volume may be excluded from the training dataset used to train the ML computer model, or at least a notification may be sent to appropriate personnel to inform them of the discrepancy, such as via a client computing device, so that the personnel can determine whether to include the volume in the training dataset.

During runtime operation, or inference time, in addition to inputting the volume of medical images into the trained ML computer model for performance of a prediction operation in accordance with the ML computer model's training, the volume of medical images may be input to the mechanisms of the illustrative embodiments for evaluation to determine if there are discrepancies with the reference profile. If discrepancies are identified, then a notification may be output along with the ML computer model output, where this notification may indicate that that ML computer model output may not be accurate and specifying the type of discrepancy and/or source or error that was detected by the mechanisms of the illustrative embodiments. Thus, the user of the ML computer model output may be notified that the ML computer model operation may be faulty due to problems associated with the input data.

Thus, the illustrative embodiments may be used to perform data quality checking such as to prepare training data for a task, e.g., liver segmentation, registration, lesion detection, etc., by discarding volumes of poor image quality or annotation quality (due to segmentation). The illustrative embodiments may also be used prior to, during, or after running the trained ML computer model, which may perform its trained operations, e.g., liver segmentation, registration, lesion detection, etc. and provide an output, to know if the ML computer model's task has been performed successfully or not so that appropriate corrective action can be taken, e.g., whether or not one can rely upon the output from the ML computer model given the input data if there are detected discrepancies in the input data.

Moreover, in some cases, the mechanisms of the illustrative embodiments may be implemented when acquiring a scan of a patient to determine if the image acquisition is done satisfactorily or whether a rescan of the patient is necessary. That is, if a newly acquired volume of medical images is acquired by the medical imaging equipment, the new volume may be processed to generate a scan profile which is then compared to the reference profile generated by way of the mechanisms of the illustrative embodiments, and discrepancies detected, classified, and corresponding notifications may be output which may prompt the radiologist or other SME to re-scan the patient.

In still other illustrative embodiments, the mechanisms described above may be used to check the quality of human SME labeling or annotation of medical images in volumes, such as for ML computer model training. That is, to train a ML computer model, the training data typically includes medical image data along with corresponding annotations which can be used as a ground truth to train the ML computer model. These annotations, or labels, are typically generated by a human SME. These annotations may include the SME identifying the mask for the particular anatomical structure of interest and labeling it accordingly. The mechanisms of the illustrative embodiments may be used to provide a feedback notification to the SME when the SME's annotations are not accurate by looking at the SME's annotations and the corresponding dimension measures, e.g., cross-sectional size computed from the annotation, to determine if there is a discrepancy from the expected dimension measurements specified by the reference profile. That is, if the SME incorrectly annotates the mask in the medical images, then the cross-sectional size computed from this mask will differ significantly from the reference profile and thus, this discrepancy will be detected and a corresponding notification output to the SME via their client computing device. The SME may then take corrective action to correct the annotation before using it to train the ML computer model.

In further illustrative embodiments, the mechanisms of the illustrative embodiments may also be used to estimate the liver extent, such as prior to processing the volume of medical images for training or interference. That is, it may be desirable to determine the percentage of liver present in the volume so that partial acquisitions with too low a percentage may be discarded prior to inclusion in a training data set or input to the ML computer model for performance of a task. Thus, by estimating the percentage of liver actually present in the volume, and comparing the percentage to a threshold percentage indicative of a sufficient amount of liver present in the volume to be able to accurately characterize the liver for purposes of ML computer model tasks, a determination may be made as to whether to include or exclude the volume from further processing, either as part of a training process for the ML computer model, or as part of an input to the ML computer model during runtime inference generation.

Figure 5:
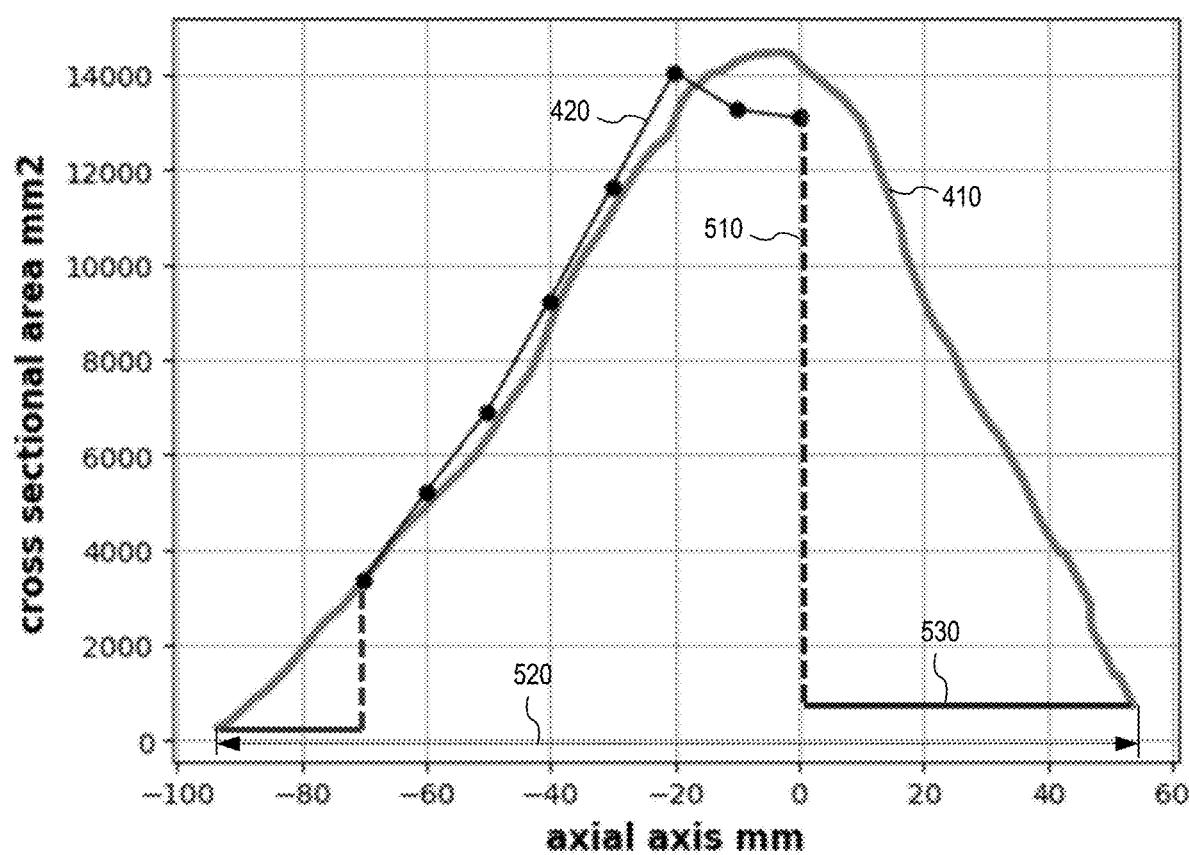
FIG. 5 is an example diagram illustrating the same comparison of scan profiles to reference liver profile shown in FIG. 4, but with the addition of graphical representations for illustrating a liver extent evaluation in accordance with one illustrative embodiment.

For example, FIG. 5 shows the same comparison of scan profiles to reference liver profile shown in FIG. 4, but with the addition of graphical representations for illustrating a liver extent evaluation in accordance with one illustrative embodiment. As shown in FIG. 5, again looking to the scan profile 420, the scan profile ends at the location indicated by the vertical line 510. The total axial size, or liver span, of the liver, based on the reference liver profile 410 is shown as the horizontal line 520. The portion of the liver that is not present in the volume corresponding to the scan profile 420 is thus, the difference between the axial axis depth of vertical line 510 and the end of the reference liver profile, i.e., dashed line 530. Thus, the portion of the liver corresponding to axial axis values ranging from vertical line 510 to the end of the reference liver profile 410 is the amount of liver not present in the volume of scan profile 420. By generating a ratio of the length of the dashed line 530 to the total size of the liver, i.e., line 520, a percentage of the liver missing from the scan profile 420 may be estimated. This is referred to as an upper missing percentage. Similar calculates can be performed for scan profiles with missing portions to the left of a corresponding vertical line as well, which would be referred to as lower missing percentages. The total missing percentage would then be the sum of the upper and lower missing percentages. If this total missing percentage is equal to or greater than a given threshold percentage, then the scan profile may be determined to not contain a sufficient amount of the liver in the medical images and thus, the volume may be discarded from further processing, and/or a notification may be generated to inform the radiologist or other SME that the volume has an insufficient amount of the anatomical structure present in the medical images or slices of the volume, so that the radiologist or other SME may take corrective action such as retaking the scan or the like.

Thus, the illustrative embodiments provide mechanisms that operate to automatically generate a reference profile for an anatomical structure of interest using a plurality of volumes of medical images for a given patient. The reference profile may be used as a basis for comparison of other scan profiles to determine which, if any, scan profiles represent an inconsistent anatomical structure with that of the reference profile, where this inconsistency may be due to the manner by which the volume of medical images were captured, due to differences between the expected anatomical structure size and that represented in the volume of medical images, or the like. These inconsistencies may be detected and classified to determine whether they are span disparity or cross-sectional size disagreements, and what types of span disparity or cross-sectional size disagreements with regard to potential source of the inconsistencies. Appropriate notifications may be generated to SMEs for performance of corrective actions. Moreover, in some cases, the volumes may be automatically discarded from further processing if they are determined to have inconsistencies that would negative affect training or runtime operation of the ML computer models. Furthermore, in some illustrative embodiments, such inconsistencies may be determined based on an evaluation of percentages of the anatomical structure represented in the volume of medical images and a required minimum amount of the anatomical structure that is needed for proper downstream processing of the volume of medical images, e.g., for training of a ML computer model or for runtime prediction operations of a trained ML computer model.

Before continuing the discussion of the various aspects of the illustrative embodiments and the improved computer operations performed by the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software executing on computer hardware, specialized computer hardware and/or firmware, or any combination thereof that performs the specified functions including, but not limited to, any use of a general and/or specialized processor in combination with appropriate software loaded or stored in a machine readable memory and executed by the processor to thereby specifically configure the processor to perform the specific functions of the illustrative embodiments. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 6:
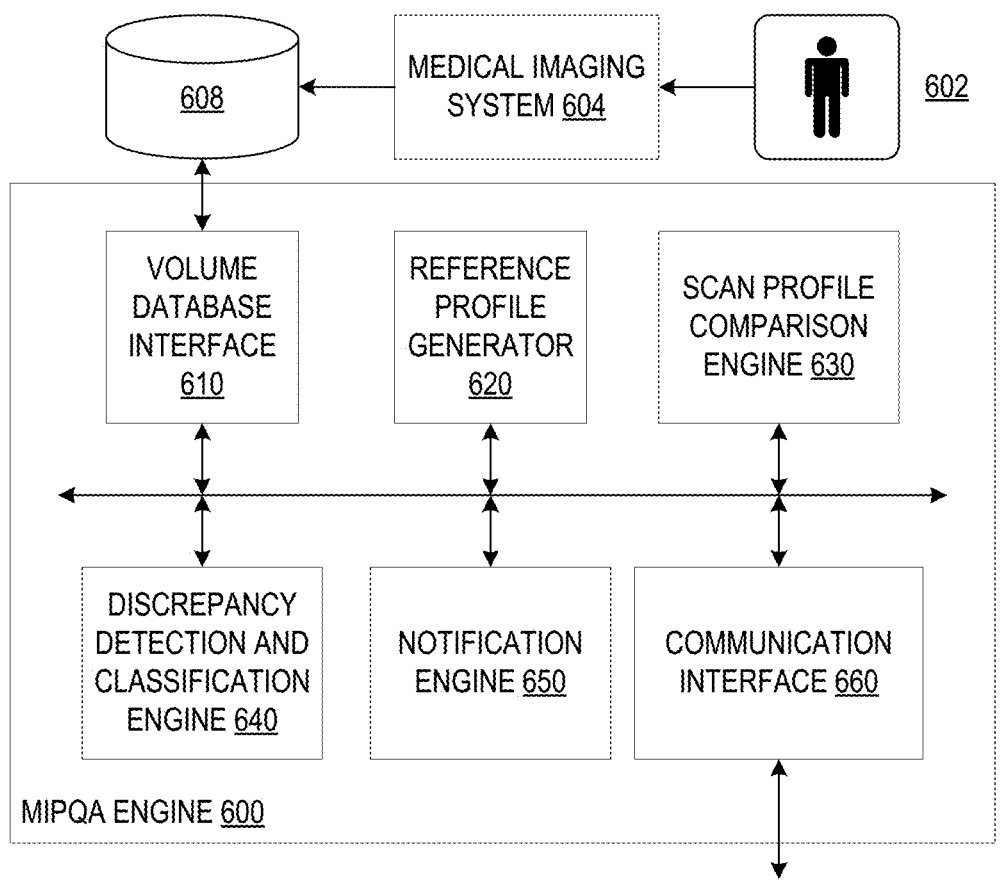
FIG. 6 is an example block diagram illustrating the primary operational components of an automated medical image and prediction quality assessment engine for machine learning tasks in accordance with one illustrative embodiment.

FIG. 6 is an example block diagram illustrating the primary operational components of an automated medical image and prediction quality assessment engine for machine learning tasks in accordance with one illustrative embodiment. The operational components shown in FIG. 6 may be implemented as specialized computer hardware devices, such as firmware or logic circuits, that are specifically configured to perform the operations attributed to those components. The operational components may also be implemented as specific software logic that is loaded into memory and executed by one or more processors of one or more computing devices to specifically configure those processors and corresponding computer hardware to operate as the operational component and performed the operations attributed to those components. Of course, in some illustrative embodiments, a combination of specialized hardware and software logic executed to configure one or more processors of one or more computing devices may be used to implement the operational components. Regardless of which configuration is selected for the particular implementation, the result is a specially configured computing device that is specialized to the performance of the operations described above and as attribute to the various primary operational components. Moreover, it should be appreciated that while FIG. 6 does not explicitly show them, the primary operational components operate with other hardware and software components of one or more computing devices that facilitate the operations attributed to the primary operational components, such as operating systems, libraries, data storages, communication interfaces, various input/output devices, databases, and other various software and circuitry.

As shown in FIG. 6, the primary operational components of an automated medical image and prediction quality assessment (MIPQA) engine 600 include a volume database interface 610, a reference profile generator 620, a scan profile comparison engine 630, a discrepancy detection and classification engine 640, a notification engine 650, and a communication interface 660. The volume database interface 610 provides the logic for accessing volumes of medical images from a medical imaging database 608 which may be a separate database 608 on one or more other computing devices, or may be a database specifically associated with the MIPQA engine 600. In the depicted example, the medical imaging database 608 is a separate database from the MIPQA engine 600 and stores volumes of medical images for one or more patients, the volumes being associated with individual patients in the database 608, where these volumes may target various anatomical structures and regions of the patient's body. The medical images that makeup the volumes may be obtained by medical imaging system 604 operating to capture images of a patient 602, such as via a CT scan, MRI, sonogram, X-ray, or the like, at various points in time, each point in time corresponding to a different volume of medical images. For example, there may be different volumes for different phases of a contrast agent, e.g., an injected radioactive dye, based medical imaging technology (multi-phase volumes) and/or the volumes may be captured and remotely located times, such as at different times of the month, year, or different years entirely. The medical images within a volume are preferably a sequential set of medical images taken as the imaging equipment traverses an axial axis of the anatomical structure of interest or area of the patient's body.

The medical imaging system 604 may include computing devices for processing the medical images captured to generate data representations of these medical images which may then be processed through segmentation and annotation, among other processes. The volumes of medical images in the database 608 may be the data representations of the medical images, or slices, captured during an imaging session at a given time point, or may be the segmented medical images. For example, the medical imaging system 604 may comprise user interfaces through which a human SME may annotate the captured images by identifying contours and masks for annotating the medical images and identifying the location of anatomical structures of interest. The medical imaging system 604 may, in addition or alternatively, include a computer aided diagnosis (CAD) system that comprises trained machine learning models, such as neural networks and the like, that operate to automatically segment medical images to identify anatomical structures and annotate these segmented medical images accordingly and thereby generate masks for the anatomical structures shown in those medical images. Of course, a combination of automated segmentation and annotation with manual correction may be utilized to provide a semi-automated segmentation and annotation tool without departing from the spirit and scope of the present invention.

It is assumed for purposes of the operation of the MIPQA engine 600 that there are at least two volumes of medical images for a given patient that target the same anatomical structure or area of the patient's body and which have generated masks for the anatomical structure of interest (either manually generated, automatically generated, or semi-automatically generated), such that dimensional measurements of the anatomical structure of interest may be made based on the masks in each of the medical images of the volumes. Thus, for example, for a given patient, there are at least two volumes of medical images targeting the liver of the patient and these volumes have masks for the liver associated with the medical images of the volumes. These volumes have metadata associated with the volumes that specify information about the conditions under which the medical images were captured, what types of medical images are represented in the volume, what area of the patient's body and/or what anatomical structure was targeted, etc. From this metadata, volumes of medical images targeting the same anatomical structure for the same patient may be identified and retrieved by the MIPQA engine 600 for performance of the operations described herein above for generating a reference profile for the anatomical structure and/or comparing scan profiles to a reference profile.

In one illustrative embodiment, a user may request that the MIPQA engine 600 generate a reference profile for an anatomical structure of a given patient via a client computing device (not shown) and the communication interface 660, which may operate to perform data communications with one or more data networks, such as a local area network, wide area network, the Internet, or the like. The communication interface 660 may employ various security measures to ensure privacy of data, such as is generally known in the art. The request to generate a reference profile may be a separate request, or may be part of a request to access the medical image volumes for a particular patient, or the operation of the MIPQA engine 600 may be automatically employed in response to a user requesting to view the medical images of a patient without having to submit a specific request to generate the reference profile. Moreover, once a reference profile for the anatomical structure of the patient is generated, it may be stored in the database 608 in combination with the volumes associated with the patient 602 for later retrieval, where there may be a different reference profile for each anatomical structure of interest of the patient or area of the patient's body. In this way, the reference profile need not be recomputed each time a new volume of medical images is captured. Of course, this reference profile may be updated periodically with all of the captured volumes, or a latest N number of volumes, in the database 608, so as to make sure that the reference profile is not stale and accurately reflects the most recent condition of the patient and his/her anatomical structures. For example, the MIPQA engine 600 may contain logic that evaluates a timestamp associated with the reference profile compared to a current timestamp and if the difference is greater than a given threshold, then the reference profile may be considered to be stale and needs to be recalculated using the latest N number of volumes for the anatomical structure of interest and the patient 602, where N is a tunable parameter.

Thus, the MIPQA engine 300 receives a plurality of volumes of medical images for a given anatomical structure and given patient 602, where these volumes have associated masks. Assuming a non-stale reference profile is not retrieved as well from the database 608, or a stale reference profile is retrieved, the reference profile generator 620 operates to generate a reference profile from the scan profiles of the retrieved volumes from the database 608. That is, as described previously, the reference profile generator 620 comprises logic that select a scan profile with the greatest span as an initial reference and then translates the other scan profiles to maximize their respective agreement (see Eq. (2) above) with the reference profile. After translating the other scan profiles to maximize agreement, a new reference profile is created by computing the pointwise median of the aligned scan profiles. Then, the scan profiles are aligned to this new reference profile so as to maximize their respective agreement with the reference profile. This operation of generating the new reference profile based on the pointwise median of the aligned scan profiles and then subsequent alignment to maximize respective agreement is iteratively repeated until the median profile stabilizes at which point the median profile is selected as the reference profile.

Having generated the reference profile, or having retrieved a non-stale reference profile from the database 608, the MIPQA engine 600 further comprises logic for comparing the scan profiles to the reference profile to detect inconsistent volumes. That is, the scan profile comparison engine 630 performs a comparison of a given scan profile to the reference profile to detect any discrepancies or disagreements between the scan profile and the reference profile. Thus, the scan profile comparison engine 630 detects portions of the scan profile that have values that are at least a threshold value smaller or greater than the expected values as indicated by the reference profile and scan profiles that do not include a complete profile of the anatomical structure. The scan profile comparison engine 630 also operates to identify the number of medical images in each volume and where the scan profiles fail to detect the anatomical structure of interest relative to the number of medical images, e.g., if there are more medical images in the volume, but the anatomical structure is not detected in those medical images, or if there are no more medical images in the volume beyond the point at which the scan profile ends.

The results of the scan profile comparison engine 630 are provided to the discrepancy detection and classification engine 640 which comprises the logic to identify the discrepancies between the scan profile and the reference profile and to classify those discrepancies as to the type of discrepancy and the potential source of the discrepancy. For example, as described previously, the discrepancy detection and classification engine 640 may comprise logic that looks to the pattern of data for the scan profile and reference profile, as well as the metadata of the volume, e.g., the number of medical images in the volume, and identifies whether a discrepancy between the scan profile and the reference profile is a span disparity or a cross-sectional size disagreement. Moreover, the discrepancy detection and classification engine 640, if it determines that the discrepancy is a span disparity, further determines whether the span disparity is due to a partial acquisition or a partial segmentation. For example, a partial acquisition may be determined to be present if the scan profile fails to detect the anatomical structure at a given point and there are no further medical images in the volume, i.e., there is insufficient span to encompass the entire anatomical structure. A partial segmentation may be determined to be present if there are additional medical images in the volume, but the anatomical structure is not detected in these additional medical images, indicating poor quality images were obtained such that segmentation was not able to be properly performed, or that the segmentation operation failed because of an algorithm failure.

If the discrepancy detection and classification engine 640 determines that the discrepancy is a cross-sectional size disagreement, then the discrepancy detection and classification engine 640 may further determine if this size disagreement indicates that the anatomical structure in the volume is of a smaller size than expected or a larger size than expected and thus, can determine if the source of the error may be due to a possible medical procedure that reduced the size of the anatomical structure, or may be due to a medical condition that expanded the size of the anatomical structure. These are considered possible sources of the discrepancy, but it should be considered that an additional possible source of the discrepancy may be an algorithm failure as well, should it be determined that the size disagreement is not due to a medical procedure or medical condition.

Furthermore, in some illustrative embodiments, the discrepancy detection and classification engine 640 may determine the extent of the anatomical structure and the amount of the anatomical structure represented in the volume. This amount of the anatomical structure represented, e.g., the upper and lower percentages of the anatomical structure, may be compared to a threshold amount required for further use of the volume and if the threshold amount is not met or exceeded, the volume may be flagged for discarding or recapturing of the volume, as described previously.

Based on results of the discrepancy detection and classification engine 640, the notification engine 650 may generate appropriate notifications to SMEs for output on their respective client computing devices, and/or notifications to other automated systems to include/exclude volumes of medical images in their training datasets or runtime inputs. In some illustrative embodiments, the notification engine 650 may output a notification along with the representation of the volumes of medical images that are output to a viewer application of a SME's client computing system used to view the medical images. This message may indicate the particular volume, if any, where an inconsistency is detected as well as specify the nature of the inconsistency and/or possible source of the inconsistency. In some cases, this notification may also include an output of the scan profiles relative to the reference profiles, a view of the volumes of medical images, and may highlight or otherwise indicate the particular volume of medical images and/or scan profile where the inconsistency is identified. The notifications may be output to the SME's client computing system via the communication interface 660.

Figure 7:
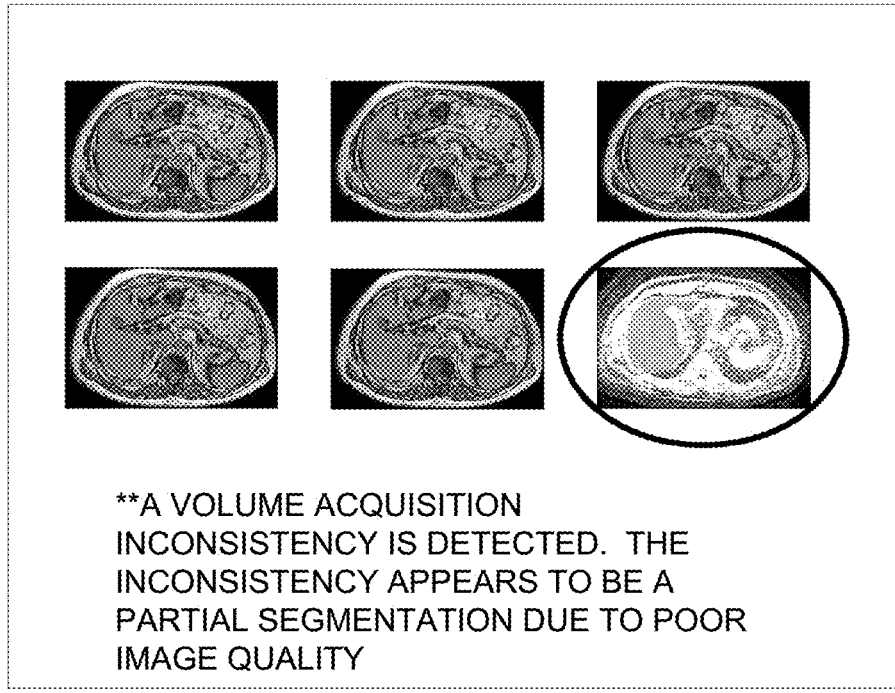
FIG. 7 is an example diagram of an output comprising a graphical representation of the volumes of medical images associated with the anatomical structure of interest along with a notification in accordance with one illustrative embodiment.

As an example, as shown in FIG. 7, one output that may be generated by the mechanisms of the illustrative embodiments is a graphical representation of the volumes of medical images associated with the anatomical structure of interest and the patient via a medical imaging viewer of a client computing system. In the depicted example, there are 6 volumes represented by the 6 different medical images, each of which may have animations that step through the sequence of medical images captured as part of that corresponding volume. In the depicted example, the $6^{th}$ volume, shown in the bottom right corner, a segmentation operation is first performed to process all the volumes and this $6^{th}$ volume is determined, through the profile comparison mechanisms of the illustrative embodiments, to be inconsistent with the other volumes because its scan profile is determined to be significantly different from the scan profiles of the other volumes. Thus, the $6^{th}$ volume is highlighted, which in this case is represented by the circle surrounding the $6^{th}$ volume, and a corresponding notification is added to the output of the viewer. In this case, it is determined that a volume acquisition inconsistency was detected and that this inconsistency appears to be a partial segmentation due to poor image quality, or an algorithm failure of the segmentation algorithms which may be a default possible source of such inconsistencies, i.e., it is always possible that the algorithm itself is the possible source of the inconsistencies. Similar notifications can be generated for other types of inconsistencies and sources of the inconsistencies, e.g., partial acquisition, size greater than expected, size less than expected, insufficient amount of anatomical structure represented, etc.

Figure 8:
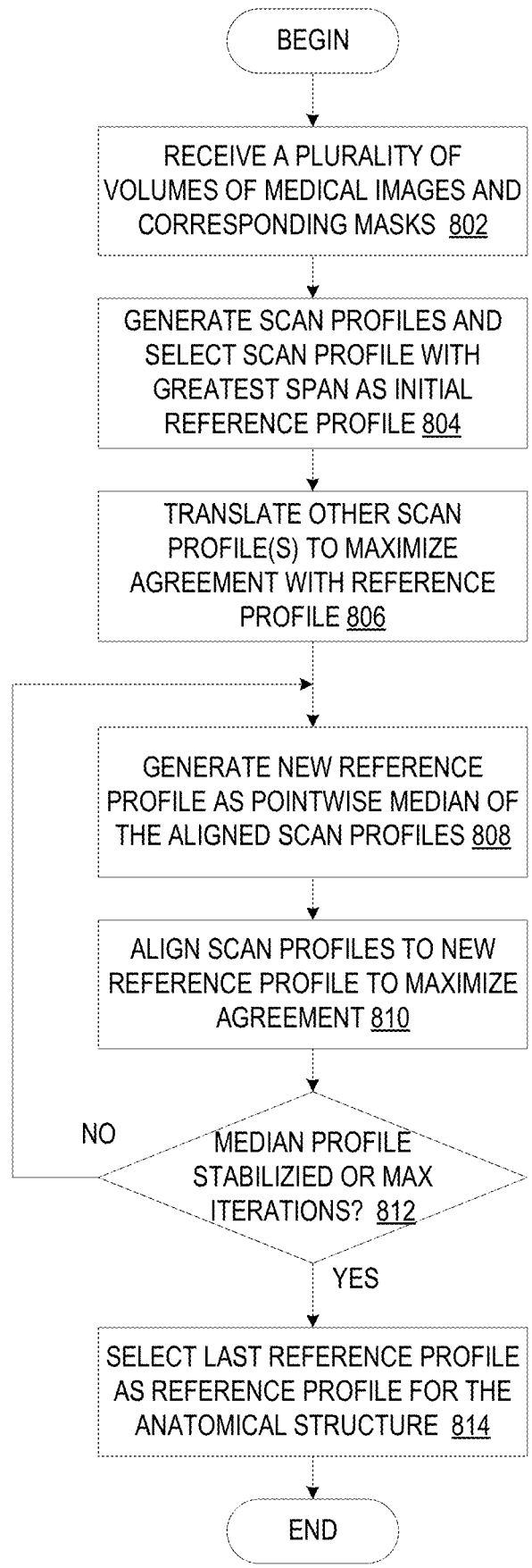
FIG. 8 is a flowchart outlining an example operation of a MIPQA engine with regard to generating a reference profile for an anatomical structure in accordance with one illustrative embodiment.

FIG. 8 is a flowchart outlining an example operation of a MIPQA engine with regard to generating a reference profile for an anatomical structure in accordance with one illustrative embodiment. It should be appreciated that the operations outlined in FIG. 8 are specifically performed automatically by an improved computer tool of the illustrative embodiments and are not intended to be, and cannot practically be, performed by human beings either as mental processes or by organizing human activity. To the contrary, while human beings may initiate the performance of the operation set forth in FIG. 8 and may make use of the results generated as a consequence of the operations set forth in FIG. 8, the operations in FIG. 8 themselves are specifically performed by the improved computing tool in an automated manner.

As shown in FIG. 8, the operation starts by receiving a plurality of volumes of medical images and corresponding masks for an anatomical structure of interest, e.g., a human liver, of a given patient (step 802). Scan profiles are generated for the volumes and a scan profile having a greatest span is selected as an initial reference profile (step 804). The other scan profile(s) are translated (shifted along the axial axis) to maximize an agreement metric with regard to the reference profile (step 806). A new reference profile is then generated as the pointwise median of the aligned scan profiles (step 808). The scan profiles are then aligned to the new reference profile to maximize the agreement metric (step 810). A determination is then made as to whether the median profile has stabilized or a maximum number of iterations has occurred (the number of iterations performed may be maintained as an incremented counter) (step 812). If not, the operation returns to step 808. If the median profile has stabilized, or a predetermined number of iterations have been performed, the operation proceeds to selecting the last reference profile as the reference profile for the anatomical structure of interest (step 814) and the operation terminates.

Figure 9:
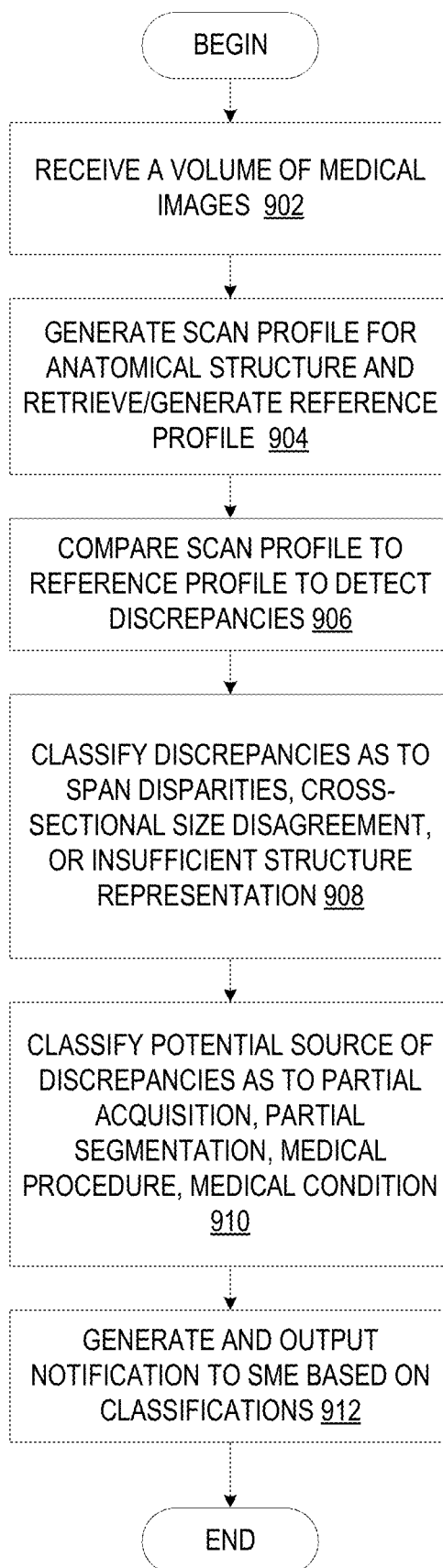
FIG. 9 is a flowchart outlining an example operation of a MIPQA engine with regard to detecting inconsistencies between scan profiles and a reference profile for an anatomical structure in accordance with one illustrative embodiment.

FIG. 9 is a flowchart outlining an example operation of a MIPQA engine with regard to detecting inconsistencies between scan profiles and a reference profile for an anatomical structure in accordance with one illustrative embodiment. Again, it should be appreciated that the operations outlined in FIG. 9 are specifically performed automatically by an improved computer tool of the illustrative embodiments and are not intended to be, and cannot practically be, performed by human beings either as mental processes or by organizing human activity. To the contrary, while human beings may initiate the performance of the operation set forth in FIG. 9 and may make use of the results generated as a consequence of the operations set forth in FIG. 9, the operations in FIG. 9 themselves are specifically performed by the improved computing tool in an automated manner.

As shown in FIG. 9, the operation starts by receiving a volume of medical images (step 902). A scan profile is generated for the received volume with regard to an anatomical structure of interest, and a corresponding reference profile is retrieved or generated for that anatomical structure (step 904). As described previously, this may involve retrieving a previously generated reference profile that is not stale or may involve using a plurality of stored volumes of medical images and their corresponding scan profiles to generate a reference profile, such as in the manner described above and/or with regard to FIG. 8.

The scan profile for the currently received volume is compared to the reference profile to detect any discrepancies (step 906). Assuming there are discrepancies, the discrepancies are classified as to whether they are span disparities, cross-sectional size disagreements, or insufficient structure representations (step 908). The discrepancies may further be classified as to the potential sources of such discrepancies such as a partial acquisition, partial segmentation, medical procedure leading to a smaller than expected cross-sectional size, medical condition leading to a larger than expected cross-sectional size, or the like (step 910). Thereafter a corresponding notification and output of the notification is generated to a SME based on these classifications, such as via a medical imaging viewer at a client computing system, for example (step 912). The operation then terminates.

Figure 10:
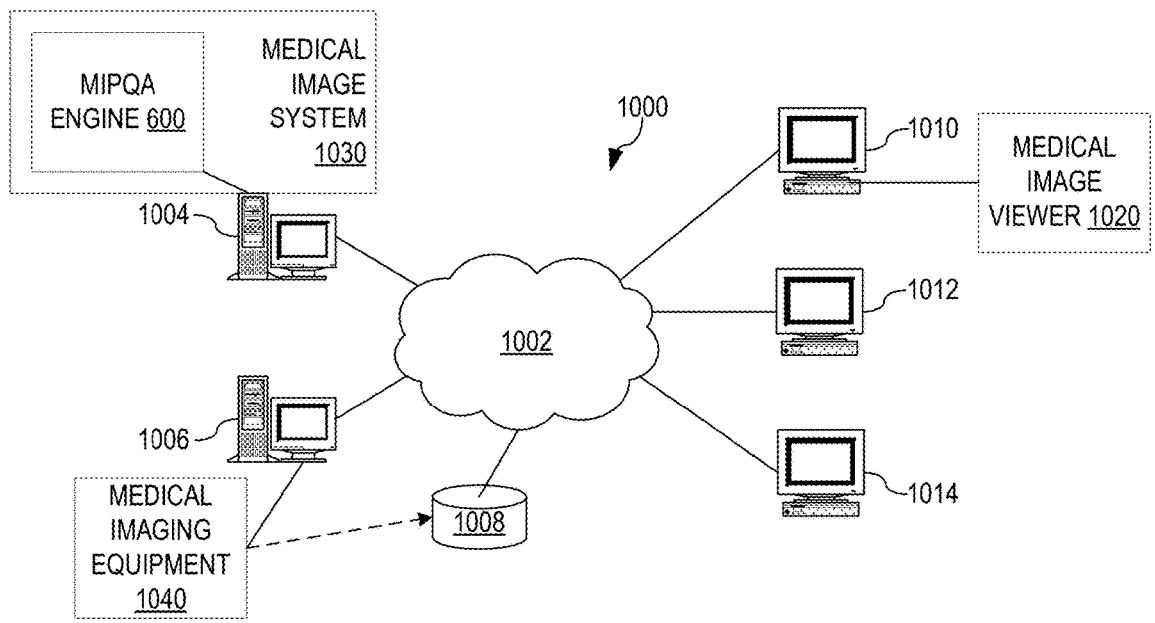
FIG. 10 is an example diagram of a distributed data processing system in which aspects of the illustrative embodiments may be implemented.
Figure 11:
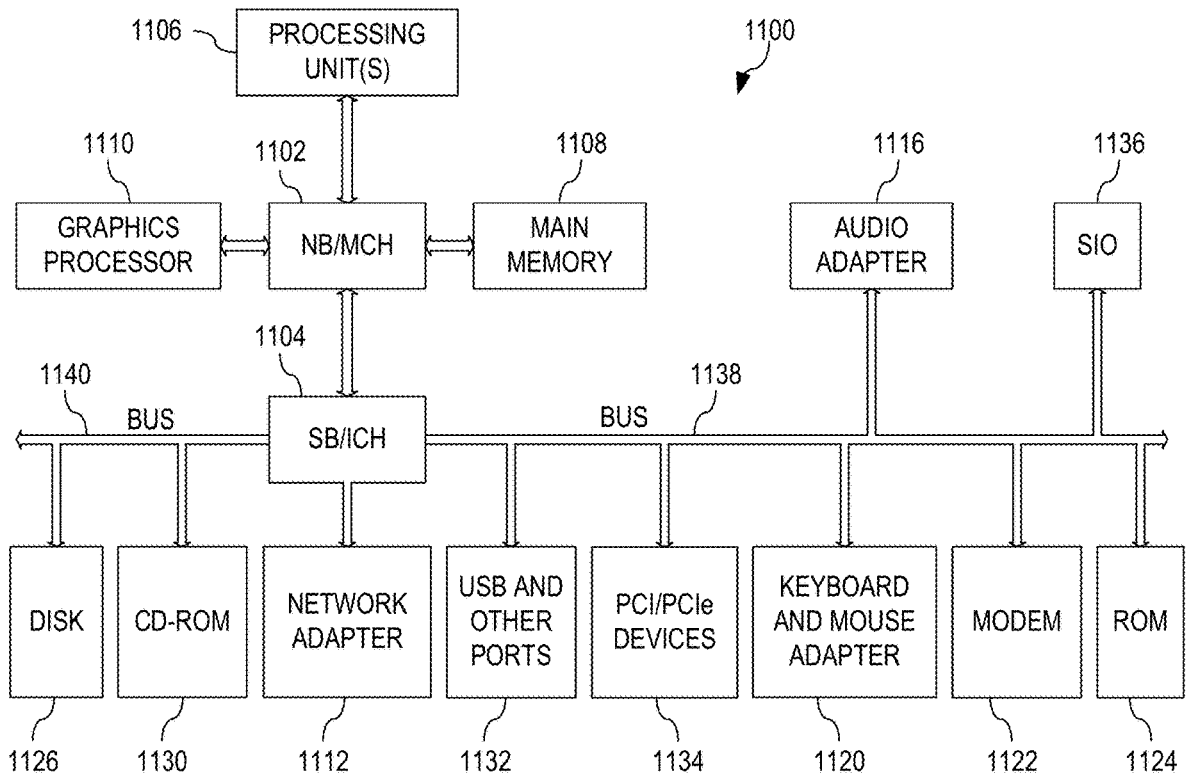
FIG. 11 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 10 and 11 are provided hereafter as example environments in which aspects of the illustrative embodiments may be implemented. It should be appreciated that FIGS. 10 and 11 are only examples and are not intended to assert or imply any limitation with regard to the environments in which aspects or embodiments of the present invention may be implemented. Many modifications to the depicted environments may be made without departing from the spirit and scope of the present invention.

FIG. 10 depicts a pictorial representation of an example distributed data processing system in which aspects of the illustrative embodiments may be implemented. Distributed data processing system 1000 may include a network of computers in which aspects of the illustrative embodiments may be implemented. The distributed data processing system 1000 contains at least one network 1002, which is the medium used to provide communication links between various devices and computers connected together within distributed data processing system 1000. The network 1002 may include connections, such as wire, wireless communication links, or fiber optic cables.

In the depicted example, server 1004 and server 1006 are connected to network 1002 along with storage unit 1008. In addition, clients 1010, 1012, and 1014 are also connected to network 1002. These clients 1010, 1012, and 1014 may be, for example, personal computers, network computers, or the like. In the depicted example, server 1004 provides data, such as boot files, operating system images, and applications to the clients 1010, 1012, and 1014. Clients 1010, 1012, and 1014 are clients to server 1004 in the depicted example. Distributed data processing system 1000 may include additional servers, clients, and other devices not shown.

In the depicted example, distributed data processing system 1000 is the Internet with network 1002 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 1000 may also be implemented to include a number of different types of networks, such as for example, an intranet, a local area network (LAN), a wide area network (WAN), or the like. As stated above, FIG. 10 is intended as an example, not as an architectural limitation for different embodiments of the present invention, and therefore, the particular elements shown in FIG. 10 should not be considered limiting with regard to the environments in which the illustrative embodiments of the present invention may be implemented.

As shown in FIG. 10, one or more of the computing devices, e.g., server 1004, may be specifically configured to implement a MIPQA engine 600 in accordance with one or more of the illustrative embodiments described above. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 1004, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described herein, the implementation of the mechanisms of the illustrative embodiments improves the functionality of the computing device and provides a useful and concrete result that facilitates evaluating the quality of medical images of volumes of medical images with regard to an anatomical structure, identification of potential discrepancies in medical images, classification of these discrepancies with regard to types of errors in the acquisition or quality of the medical images, and identification of potential sources of such discrepancies. Moreover, the illustrative embodiments may operate to identify medical image volumes to include/exclude from training datasets and/or from further downstream processing due to such discrepancies so as to avoid improper or faulty operation of ML computer models.

For example, as shown in FIG. 10, a user of a client computing device 1010 may interact with a medical image viewer application 1020 executing on the client computing device to access a volume of medical images for a given patient and for a given anatomical structure or area of the patient's body. The user may send a request to view such a volume from the medical image viewer 1020 to a medical image system 1030 executing on server 1004, which may include the MIPQA engine 600 of the illustrative embodiments, or may otherwise operate in conjunction with a MIPQA engine 600 in accordance with the illustrative embodiments. In response to a request from the medical image viewer 1020, the medical image system 1030 may send a request to an online database 1008, or may otherwise retrieve from a local/remote database or storage, the volumes of medical images corresponding to the patient and/or anatomical structure of interest and any non-stale reference profiles associated with the patient/anatomical structure. The volumes of medical images may be captured by medical imaging equipment 1040 that may also be coupled to computing system 1006 which may process the captured images and generate data representations that may be stored in the local/remote databases.

The medical image system 1030 may process the retrieved volumes which may include having the MIPQA engine 600 perform its processing to generate scan profiles and a reference profile in accordance with one or more of the illustrative embodiments described above, perform comparisons of scan profiles to a retrieved/generated reference profile, and classify any discrepancies for generation of notifications. The medical image system 1030 may then return to the medical image viewer 1020 a view of the volumes of medical images along with any notifications generated by the MIPQA engine 600. For example, the medical image system 1030 may generate a view such as shown in FIG. 7 with notifications, highlighting, and/or other indications of potential inconsistencies in volumes of medical images along with specification of the classifications of these inconsistencies and potential sources of the inconsistencies.

The mechanisms of the illustrative embodiments utilize specifically configured computing devices, or data processing systems, to perform the various operations described previously with regard to the MIPQA engine 600. These computing devices, or data processing systems, may comprise various hardware elements which are specifically configured, either through hardware configuration, software configuration, or a combination of hardware and software configuration, to implement one or more of the systems/subsystems described herein. FIG. 11 is a block diagram of just one example data processing system in which aspects of the illustrative embodiments may be implemented. Data processing system 1100 is an example of a computer, such as server 1004 in FIG. 10, in which computer usable code or instructions implementing the processes and aspects of the illustrative embodiments of the present invention may be located and/or executed so as to achieve the operation, output, and external effects of the illustrative embodiments as described herein.

In the depicted example, data processing system 1100 employs a hub architecture including north bridge and memory controller hub (NB/MCH) 1102 and south bridge and input/output (I/O) controller hub (SB/ICH) 1104. Processing unit 1106, main memory 1108, and graphics processor 1110 are connected to NB/MCH 1102. Graphics processor 1110 may be connected to NB/MCH 1102 through an accelerated graphics port (AGP).

In the depicted example, local area network (LAN) adapter 1112 connects to SB/ICH 1104. Audio adapter 1116, keyboard and mouse adapter 1120, modem 1122, read only memory (ROM) 1124, hard disk drive (HDD) 1126, CD-ROM drive 1130, universal serial bus (USB) ports and other communication ports 1132, and PCI/PCIe devices 1134 connect to SB/ICH 1104 through bus 1138 and bus 1140. PCI/PCIe devices may include, for example, Ethernet adapters, add-in cards, and PC cards for notebook computers. PCI uses a card bus controller, while PCIe does not. ROM 1124 may be, for example, a flash basic input/output system (BIOS).

HDD 1126 and CD-ROM drive 1130 connect to SB/ICH 1104 through bus 1140. HDD 1126 and CD-ROM drive 1130 may use, for example, an integrated drive electronics (IDE) or serial advanced technology attachment (SATA) interface. Super I/O (SIO) device 1136 may be connected to SB/ICH 1104.

An operating system runs on processing unit 1106. The operating system coordinates and provides control of various components within the data processing system 1100 in FIG. 11. As a client, the operating system may be a commercially available operating system such as Microsoft® Windows 10®. An object-oriented programming system, such as the Java™ programming system, may run in conjunction with the operating system and provides calls to the operating system from Java™ programs or applications executing on data processing system 1100.

As a server, data processing system 1100 may be, for example, an IBM eServer™ System p° computer system, Power™ processor based computer system, or the like, running the Advanced Interactive Executive (AIX®) operating system or the LINUX® operating system. Data processing system 1100 may be a symmetric multiprocessor (SMP) system including a plurality of processors in processing unit 1106. Alternatively, a single processor system may be employed.

Instructions for the operating system, the object-oriented programming system, and applications or programs are located on storage devices, such as HDD 1126, and may be loaded into main memory 1108 for execution by processing unit 1106. The processes for illustrative embodiments of the present invention may be performed by processing unit 1106 using computer usable program code, which may be located in a memory such as, for example, main memory 1108, ROM 1124, or in one or more peripheral devices 1126 and 1130, for example.

A bus system, such as bus 1138 or bus 1140 as shown in FIG. 11, may be comprised of one or more buses. Of course, the bus system may be implemented using any type of communication fabric or architecture that provides for a transfer of data between different components or devices attached to the fabric or architecture. A communication unit, such as modem 1122 or network adapter 1112 of FIG. 11, may include one or more devices used to transmit and receive data. A memory may be, for example, main memory 1108, ROM 1124, or a cache such as found in NB/MCH 1102 in FIG. 11.

As mentioned above, in some illustrative embodiments the mechanisms of the illustrative embodiments may be implemented as application specific hardware, firmware, or the like, application software stored in a storage device, such as HDD 1126 and loaded into memory, such as main memory 1108, for executed by one or more hardware processors, such as processing unit 1106, or the like. As such, the computing device shown in FIG. 11 becomes specifically configured to implement the mechanisms of the illustrative embodiments and specifically configured to perform the operations and generate the outputs described herein with regard to the MIPQA engine 600.

Those of ordinary skill in the art will appreciate that the hardware in FIGS. 10 and 11 may vary depending on the implementation. Other internal hardware or peripheral devices, such as flash memory, equivalent non-volatile memory, or optical disk drives and the like, may be used in addition to or in place of the hardware depicted in FIGS. 10 and 11. Also, the processes of the illustrative embodiments may be applied to a multiprocessor data processing system, other than the SMP system mentioned previously, without departing from the spirit and scope of the present invention.

Moreover, the data processing system 1100 may take the form of any of a number of different data processing systems including client computing devices, server computing devices, a tablet computer, laptop computer, telephone or other communication device, a personal digital assistant (PDA), or the like. In some illustrative examples, data processing system 1100 may be a portable computing device that is configured with flash memory to provide non-volatile memory for storing operating system files and/or user-generated data, for example. Essentially, data processing system 1100 may be any known or later developed data processing system without architectural limitation.

It should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a medical image computer system, for identifying inconsistencies between specific volumes of medical images, the method comprising:
    receiving, by the medical image computer system, a plurality of volumes of medical images, each volume of medical images, of the plurality of volumes of medical images, comprising a plurality of medical images, of an anatomical structure of a patient, captured by a medical imaging equipment;
    generating, by the medical image computer system, a plurality of first representation data structures, each first representation data structure of the plurality of first representation data structures corresponding to a volume of medical images in the plurality of volumes of medical images, wherein each first representation data structure of the plurality of first representation data structures comprises first dimensional measurements of the anatomical structure at various locations;

generating, by the medical image computer system, a reference data structure for the anatomical structure of the patient based on the plurality of first representation data structures, wherein the reference data structure comprises second dimensional measurements derived from the first dimensional measurements;

detecting, by the medical image computer system, a discrepancy between a second representation data structure and the reference data structure based on a comparison of the second representation data structure and the reference data structure; and outputting, by the medical image computer system, a notification of the discrepancy to a computing system based on the detecting of the discrepancy.

2. The method of claim 1, wherein the generating of the reference data structure comprises:
selecting a first representation data structure from the plurality of first representation data structures to be a candidate reference data structure;
aligning first representation data structures, in the plurality of first representation data structures, other than the first representation data structure, to the selected first representation data structure; and
generating the reference data structure based on the aligned first representation data structures.

3. The method of claim 2, wherein the generating of the reference data structure based on the aligned first representation data structures further comprises, iteratively until a stopping condition is reached:
generating a median reference data structure based on a median of the aligned first representation data structures;
selecting the median reference data structure as a new reference data structure for a next iteration; and
aligning the plurality of first representation data structures to the new reference data structure, to thereby generate the aligned first representation data structures for the next iteration.

4. The method of claim 3, wherein the stopping condition is either the new reference data structure for the next iteration is stabilized with regard to a reference data structure of a previous iteration, or a predetermine number of iterations have been performed.

5. The method of claim 1, wherein the detecting of the discrepancy comprises:
determining a distance between data points of the second representation data structure, at given locations of the anatomical structure, and data points of the reference data structure at the same given locations; and
classifying the discrepancy into one of a plurality of predetermined classifications based on the distance between the data points of the second representation data structure and the reference data structure.

6. The method of claim 1, wherein the detecting of the discrepancy comprises classifying the discrepancy as one of:
a span disparity based on the comparison of the second representation data structure and the reference data structure indicating that the second representation data structure does not contain dimensional measurements for a span of the anatomical structure represented in the reference data structure;

a cross-sectional size disagreement based on the comparison of the second representation data structure and the reference data structure indicating one or more cross-sectional sizes of the anatomical structure that are greater than or less than an expected cross-sectional size specified in the reference data structure for a same location of the anatomical structure; or insufficient structure representation based on a percentage of the anatomical structure represented in the second representation data structure being below a predetermined threshold.

7. The method of claim 1, further comprising classifying the discrepancy, wherein the classifying of the discrepancy comprises classifying a source of the discrepancy as one of:
a partial acquisition based on the discrepancy being classified as a span disparity and there being no more medical images in a volume, corresponding to the second representation data structure, beyond an end point of a plot of a curve of data points of the second representation data structure;
a partial segmentation based on the discrepancy being classified as the span disparity and there being more medical images in the volume, corresponding to the second representation data structure, beyond the end point of the plot of the curve of the data points of the second representation data structure;
a medical procedure discrepancy based on the discrepancy being classified as a cross-sectional size disagreement and one or more dimensional measurements in the second representation data structure being smaller than one or more corresponding dimensional measurements in the reference data structure; or
a medical condition discrepancy based on the discrepancy being classified as the cross-sectional size disagreement and the one or more dimensional measurements in the second representation data structure being larger than the one or more corresponding dimensional measurements in the reference data structure.

8. The method of claim 1, further comprising discarding the volume from inclusion in a training dataset of a machine learning computer model based on the detecting of the discrepancy.

9. The method of claim 1, further comprising outputting a notification indicating a potential faulty output of a trained machine learning computer model based on the detecting of the discrepancy and a volume of medical images corresponding to the second representation data structure being input to the trained machine learning computer model.

10. The method of claim 1, wherein
the first representation data structures are scan profiles of the specific volumes in the plurality of volumes,
each volume of the plurality of volumes has an associated scan profile from the scan profiles, and
each scan profile of the scan profiles comprises, for each medical image in a corresponding volume of the plurality of volumes, a cross-sectional dimension of the anatomical structure at a given location corresponding to a medical image in the corresponding volume.

11. A computer program product comprising a computer readable storage medium having a computer readable program stored therein, wherein the computer readable program, when executed on a medical image computer system, causes the medical image computer system to identify inconsistencies between specific volumes of medical images at least by:
receiving a plurality of volumes of medical images, each volume of medical images, of the plurality of volumes of medical images, comprising a plurality of medical images, of an anatomical structure of a patient, captured by a medical imaging equipment;

generating a plurality of first representation data structures, each first representation data structure of the plurality of first representation data structures corresponding to a volume of medical images in the plurality of volumes of medical images,
wherein each first representation data structure of the plurality of first representation data structures comprises first dimensional measurements of the anatomical structure at various locations;

generating a reference data structure for the anatomical structure of the patient based on the plurality of first representation data structures, wherein the reference data structure comprises second dimensional measurements derived from the first dimensional measurements;

detecting a discrepancy between a second representation data structure and the reference data structure based on a comparison of the second representation data structure and the reference data structure; and outputting a notification of the discrepancy to a computing system based on the detecting of the discrepancy.

12. The computer program product of claim 11, wherein the generating of the reference data structure comprises:
selecting a first representation data structure from the plurality of first representation data structures to be a candidate reference data structure;
aligning first representation data structures, in the plurality of first representation data structures, other than the first representation data structure, to the selected first representation data structure; and
generating the reference data structure based on the aligned first representation data structures.

13. The computer program product of claim 12, wherein the generating of the reference data structure based on the aligned first representation data structures further comprises, iteratively until a stopping condition is reached:
generating a median reference data structure based on a median of the aligned first representation data structures;
selecting the median reference data structure as a new reference data structure for a next iteration; and
aligning the plurality of first representation data structures to the new reference data structure, to thereby generate the aligned first representation data structures for the next iteration.

14. The computer program product of claim 13, wherein the stopping condition is either the new reference data structure for the next iteration is stabilized with regard to a reference data structure of a previous iteration, or a predetermine number of iterations have been performed.

15. The computer program product of claim 11, wherein the detecting of the discrepancy comprises:
determining a distance between data points of the second representation data structure, at given locations of the anatomical structure, and data points of the reference data structure at the same given locations; and
classifying the discrepancy into one of a plurality of predetermined classifications based on the distance between the data points of the second representation data structure and the reference data structure.

16. The computer program product of claim 11, wherein the detecting of the discrepancy comprises classifying the discrepancy as one of:

a span disparity based on the comparison of the second representation data structure and the reference data structure indicating that the second representation data structure does not contain dimensional measurements for a span of the anatomical structure represented in the reference data structure;

a cross-sectional size disagreement based on the comparison of the second representation data structure and the reference data structure indicating one or more cross-sectional sizes of the anatomical structure that are greater than or less than an expected cross-sectional size specified in the reference data structure for a same location of the anatomical structure; or insufficient structure representation based on a percentage of the anatomical structure represented in the second representation data structure being below a predetermined threshold.

17. The computer program product of claim 11, further comprising classifying the discrepancy, wherein the classifying of the discrepancy comprises classifying a source of the discrepancy as one of:

a partial acquisition based on the discrepancy being classified as a span disparity and there being no more medical images in a volume, corresponding to the second representation data structure, beyond an end point of a plot of a curve of data points of the second representation data structure;

a partial segmentation based on the discrepancy being classified as the span disparity and there being more medical images in the volume, corresponding to the second representation data structure, beyond the end point of the plot of the curve of the data points of the second representation data structure;

a medical procedure discrepancy based on the discrepancy being classified as a cross-sectional size disagreement and one or more dimensional measurements in the second representation data structure being smaller than one or more corresponding dimensional measurements in the reference data structure; or a medical condition discrepancy based on the discrepancy being classified as the cross-sectional size disagreement and the one or more dimensional measurements in the second representation data structure being larger than the one or more corresponding dimensional measurements in the reference data structure.

18. The computer program product of claim 11, wherein the computer readable program further causes the medical image computer system to:
discard the volume from inclusion in a training dataset of a machine learning computer model based on the detecting of the discrepancy; or
output a notification indicating a potential faulty output of a trained machine learning computer model based on the detecting of the discrepancy and a volume of medical images corresponding to the second representation data structure being input to the trained machine learning computer model.

19. The computer program product of claim 11, wherein the first representation data structures are scan profiles of the specific volumes in the plurality of volumes,
each volume of the plurality of volumes has an associated scan profile from the scan profiles, and
each scan profile of the scan profiles comprises, for each medical image in a corresponding volume of the plurality of volumes, a cross-sectional dimension of the anatomical structure at a location corresponding to a medical image in the corresponding volume.

20. An apparatus, comprising:
at least one processor; and
at least one memory coupled to the at least one processor, wherein the at least one memory comprises instructions which, when executed by the at least one processor, cause the at least one processor to:
receive plurality of volumes of medical images, each volume of medical images, of the plurality of volumes of medical images, comprising a plurality of medical images, of an anatomical structure of a patient, captured by a medical imaging equipment;
generate a plurality of first representation data structures, each first representation data structure of the plurality of first representation data structures corresponding to a volume of medical images in the plurality of volumes of medical images, wherein each first representation data structure of the plurality of first representation data structures comprises first dimensional measurements of the anatomical structure at various locations;
generate a reference data structure for the anatomical structure of the patient based on the plurality of first representation data structures, wherein the reference data structure comprises second dimensional measurements derived from the first dimensional measurements;
detect a discrepancy between a second representation data structure and the reference data structure based on a comparison of the second representation data structure and the reference data structure; and
output a notification of the discrepancy to a computing system based on the detection of the discrepancy, wherein the notification identifies a type of the discrepancy.

* * * * *